Feb. 9, 1960 W. M. MacEVOY 2,924,454
APPARATUS FOR INTERLEAVING BAGS MADE OF
A THERMOPLASTIC MATERIAL
Filed Jan. 25, 1957 4 Sheets-Sheet 3

INVENTOR
Walter M. MacEvoy

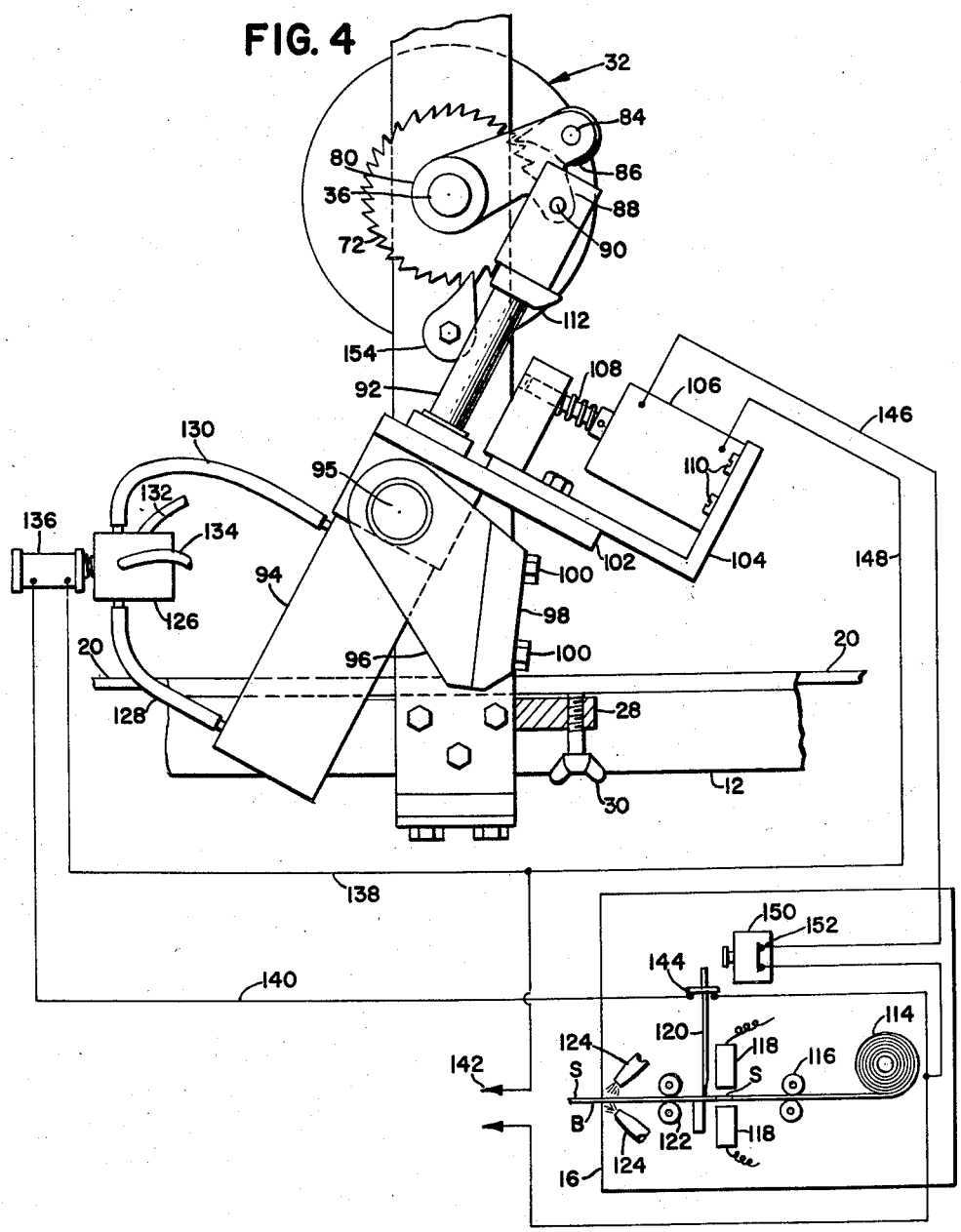

United States Patent Office 2,924,454
Patented Feb. 9, 1960

2,924,454

APPARATUS FOR INTERLEAVING BAGS MADE OF A THERMOPLASTIC MATERIAL

Walter M. MacEvoy, Lockport, N.Y.

Application January 25, 1957, Serial No. 636,334

11 Claims. (Cl. 271—83)

The present invention relates to an apparatus and method for interleaving articles as they are delivered to a conveyor and, more particularly, to an apparatus and method for temporarily interleaving bags made of a thermoplastic material, as the bags are delivered from a bag cutting and heat sealing machine to a conveyor.

In the present-day manufacture of bags made of vinylidene chloride polymers and copolymers, such as polyvinylidene chloride, the material is first extruded as a very long seamless tube. Since the tube has thin walls, it may be flattened down and rolled up in large rolls and then placed in a bag making machine where bags are formed therefrom. The roll is intermittently fed in desired lengths by feed rollers between the jaws of a heat sealer. After a seal has been formed by the jaws of the heat sealer, the roll is cut adjacent the seal and the bag is delivered from the bag making machine to a take-off conveyor. The heat sealer jaws are generally of two types, namely, one for making a straight seal across the flattened tubular material or another for making a curved seal across the flattened tubular material. A straight seal is desirable for certain types of products which can conform easily to the shape of the bag, whereas a curved seal is oftentimes desirable for products such as poultry or the like where it must conform to the irregular shape of the product. The knife used to cut the proper length of bags adjacent the heat-formed seals has the same shape as the jaw of the heat sealer. After the bag has been formed and cut from the tubular stock, it is delivered from the bag making machine onto a conveyor where it is transferred for packaging.

The present-day bag sealing and cutting machines deliver bags into the take-off conveyor at a high rate of speed and, consequently, the bead of the seal formed by the heat sealing jaws of the bag making machine is still hot and tacky when it first contacts the take-off conveyor. In addition, since the bags are delivered in such a manner to the take-off conveyor that they form a shingled stack of bags on the take-off conveyor the hot seal of one bag will fall against a previously delivered bag to the conveyor. Such a condition is undesirable as the hot seal of one bag contacting another bag will cause the bags to stick together.

In the past, efforts have been made to prevent bags made of a thermoplastic material, such as "saran" or the like, from sticking together by dusting the hot seals with a powder or the like as soon as the seal is made. Such efforts have proved unsatisfactory in that the dusting did not positively prevent sticking of bags together and, further, the dust remained on the bags after they were delivered by the conveyor to a point where they were packaged.

An object of the present invention is to provide a method and apparatus for interleaving bags as they are delivered from a bag making machine to the take-off conveyor or belt.

Another object of the present invention is to provide a method and apparatus which will permit the newly formed seals of a thermoplastic bag to cool and crystallize before the seal contacts another bag when the bags are delivered from a bag making machine.

Still another object of the present invention is to provide an apparatus and method for separating a group of a predetermined number of bags delivered from a bag making machine to a conveyor from a successive group of a predetermined number of bags delivered by the bag making machine, so that an operator packaging the bags can pick up an exact count of the bags from the take-off conveyor of the bag making machine.

Still another object of the present invention is to provide an apparatus for only temporarily interleaving thermoplastic bags as they are ejected from a bag making machine, the interleaving of the bags being only long enough to permit crystallization of the heat seal of the bag so that the stickiness caused by the fusion of the seal has disappeared.

A still further object of the present invention is to provide an apparatus for interleaving thermoplastic bags ejected from a bag making machine, the interleaving means of the apparatus being gradually removed from between the bags as the bags travel on the take-off conveyor.

These and other objects of the present invention will appear more fully in the following specification, claims and drawings, in which:

Figure 1:
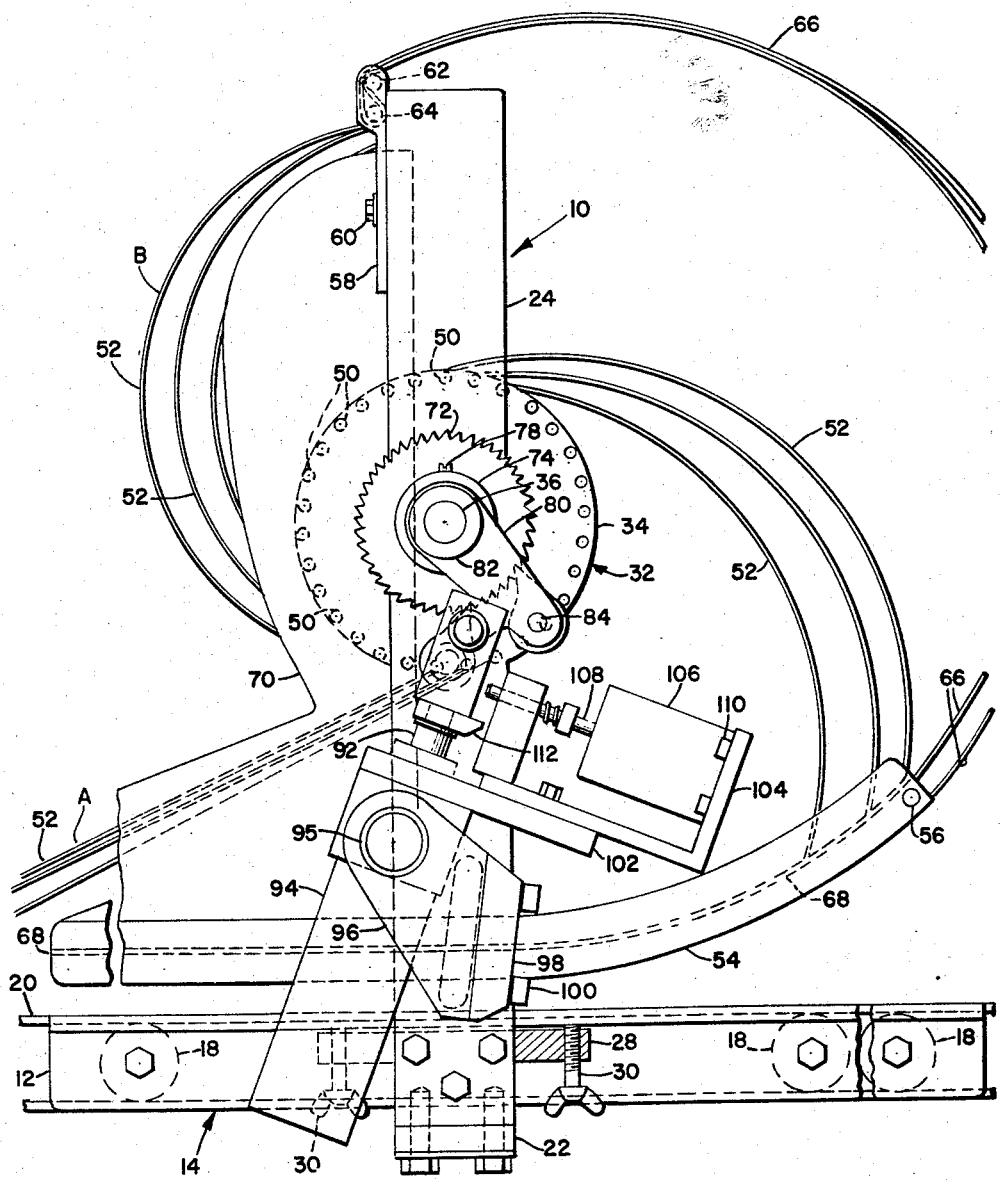
Figure 1 is a side elevational view of the apparatus of the present invention associated with the take-off conveyor or belt of a bag making machine, the bag making machine and some of the interleaving leaves or sheet elements of the interleaving apparatus being omitted from this view.
Figure 3:
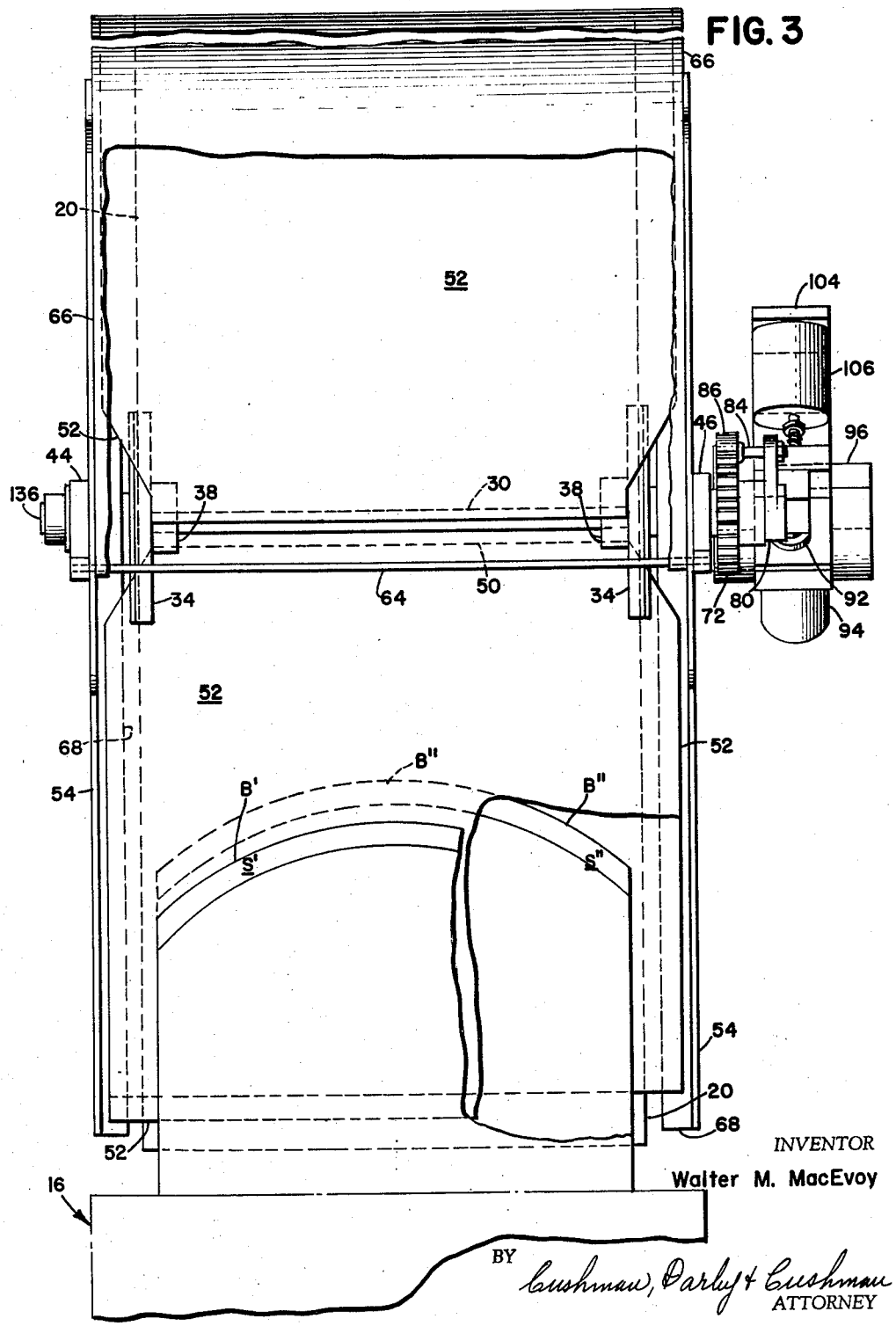

Figure 3 is a top plan view of the apparatus of Figure 1, having portions thereof broken away and showing its relative position to the bag making machine, and Figure 4 is an enlarged fragmentary view of the pawl and ratchet mechanism, as well as the air cylinder and piston assembly of the apparatus of the present invention, the figure also showing schematically the wiring diagram for the apparatus and its association with the bag making machine.

Referring to the drawings, wherein like characters or reference numerals represent like or similar parts, and particularly to Figure 1, the apparatus of the present invention includes a frame structure generally designated at 10, which is bolted to side rails 12 of an endless conveyor structure 14, adjacent the discharge end of a bag cutting and sealing machine 16 (Figure 3). In more detail, the inverted L-shaped side rails 12 of conveyor structure 14 support a plurality of rollers 18 over which extends the upper and lower runs of an endless conveyor belt 20. One end of the conveyor belt 20 is positioned adjacent the ejection end of the bag making machine 16 and bags are received therefrom and transferred by the upper run toward the other end of the conveyor belt where the bags are removed and packaged.

Figure 2:
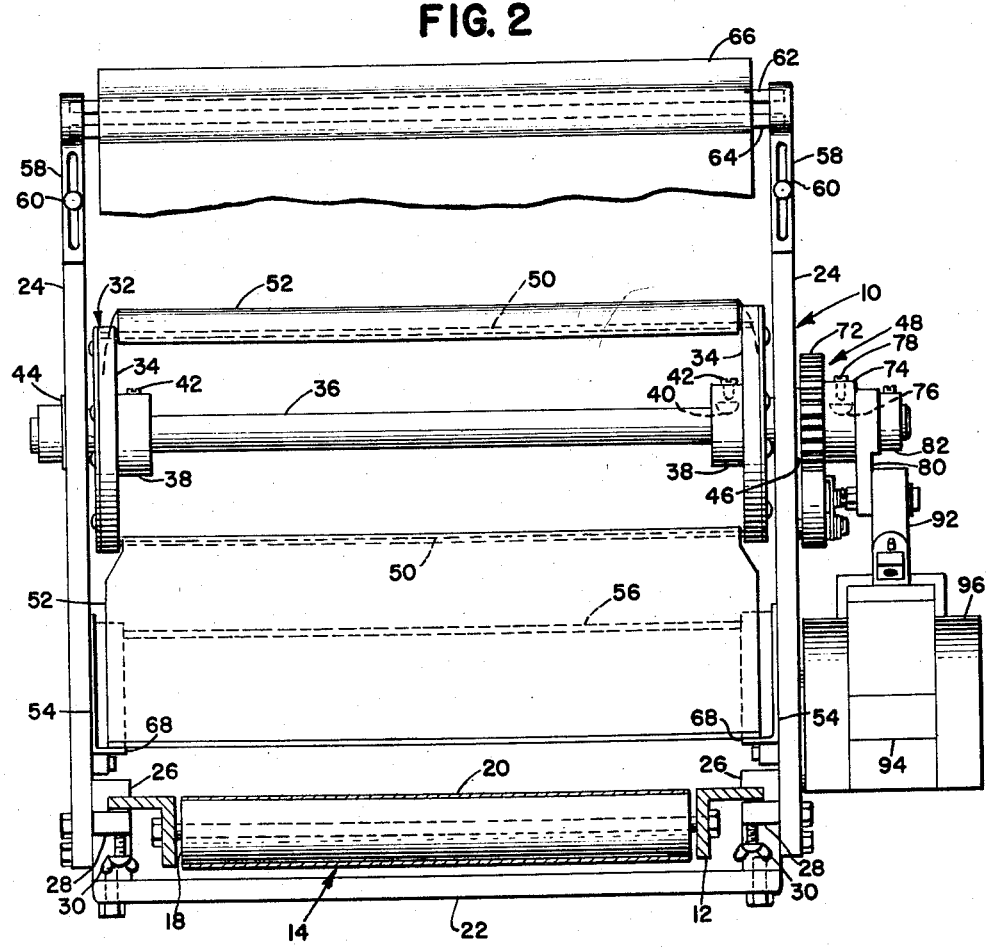
Figure 2 is an end elevational view looking from the left of Figure 1, a number of the interleaving elements being omitted for purposes of clarity.

The inverted L-shaped side rails 12 of conveyor structure 14 are utilized to support the frame structure 10 of the interleaving device of the present invention. Frame structure 10 includes a base support member 22 which extends transversely of and underneath conveyor structure 14, and a pair of vertical side supports 24 connected to opposite ends of the base support member 22 and extending upwardly over the conveyor structure 14. The side supports 24 are provided with notched elements 26 adjacent their lower ends, the elements 26 being adapted to receive the upper edge of the rails 12, as shown in Figure 2. A member 28 positioned below each of the notched elements 26 is provided with thumb screws 30 for adjustably supporting the frame structure 10 in position on the side rails 12 of conveyor structure 14. Loosening of the thumb screws 30 permits the frame structure 10 to be moved toward or away from the bag making machine 16, the adjustment depending on the length of bag being made.

A drum 32 including the spaced disks 34 mounted on a shaft 36, is rotatably supported by the vertical side supports 24 of frame structure 10 on an axis above and transverse of conveyor belt 20. As shown in Figure 2 the disks 34 are provided with hubs 38 and are keyed to the shaft 36 by a Woodruff key 40 locked in position by a set screw 42. One end of the shaft 36 is supported in a journal 44 carried on one of the vertical side supports 24, whereas the other end of the shaft 36 extends through a journal 46 and out of the other side support 24. A ratchet and pinion mechanism, generally indicated at 48, is operatively connected to the shaft 36 as will be described in detail later in the specification and it is used to rotate the drum structure 32 in intermittent step by step movement.

A plurality of rods or shafts 50 are supported at their ends by the disks 34 of drum 32. As clearly shown in Figure 1 the shafts 50 are equally spaced about the periphery of the disks 34. Mounted on each shaft 50 for pivotal movement therewith are flat flexible metal sheet elements or leaves 52 which are adapted to be interposed between successive bags ejected from the bag making machine 16. In Figures 1 and 2 a number of the sheet elements 52 have been omitted for the purpose of clarity so that the operation of the apparatus may be clearly understood.

A pair of guides 54 are secured to each of the vertical side supports 24 of frame structure 10. The guides 54 extend horizontally above the upper run of conveyor belt 20 from a point adjacent the discharge end of the bag making machine 16 and then curve upwardly, as shown in Figure 1, on a radius extending from the axis of rotation of shaft 36 to a point where they terminate a substantial distance above the top run of conveyor belt 20. A rod 56 extends between the two guides 54 at their upper ends, as shown in Figure 2. A vertically adjustable rod retainer element 58 is carried in an adjusted position on the upper end of each of the side supports 24 by means of a stud 60. Extending between the rod retainer elements 58 are a pair of rods 62 and 64 respectively. A loop of plastic material 66, preferably the same material as that from which the bags are made, such as "saran" or the like, extends around the rod 56 and the rods 62 and 64, as shown in Figure 1. The loop of plastic material 66 provides a dust cover for the flexible metal sheet elements 52, as well as a means for confining and retarding the outer ends of the sheet elements 52 as the drum is rotated in a counterclockwise direction, as viewed in Figure 1. It will be noted that the loop of plastic material 66 is on a radius substantially less than the length of a sheet element just as is the curved portion of the guide element 54, so that when the drum is rotating in a counterclockwise direction the sheet elements under the influence of the guide 54 and the loop 66 will be flexed or bowed, as shown in Figure 1.

Since the loop 66 flexes or bows the sheet elements 52, the end of the sheet elements 52 will snap out from under the rod 64 and fall quickly down into position A to receive a bag being ejected by the bag making machine 16. For each increment of rotation, one sheet 52 snaps out and falls to the position A (Figure 1) so that the bags are received in a shingled stack on the upper run of conveyor 20. Continued rotation of drum 32 will cause the sheet elements 52 to engage the flanges 68 on guides 54 and the sheet elements will then begin their confined travel and will be gradually withdrawn from between adjacent bags. The bags in shingled stacked relationship will pass under the drum 32 from the left to the right of Figure 1 and travel on the upper run of conveyor 20 to a position where they are removed from the conveyor and packaged. Suitable side guards 70 on each of the vertical side supports 24 may be provided to prevent bags from moving sideways off of a sheet element 52 when in the position A.

Referring now to Figure 4, the ratchet and pinion mechanism 48 for causing intermittent step by step rotation of drum 32 is shown in detail. Mounted on the outer end of shaft 36 is a ratchet wheel 72 having a hub 74. A Woodruff key 76 and a set screw 78 (Figure 2) key the ratchet wheel 72 to the shaft 36. A lever-actuating arm 80 is pivotally mounted on the shaft 36 for pivotal rotation with respect thereto. A collar 82 keyed to shaft 36 retains the lever-actuating arm 80 on the shaft 36, as shown in Figure 2. Lever-actuating arm 80 is provided with a pawl bolt 84 (Figure 3) which supports a spring-mounted pawl 86 that is adapted to engage the teeth of ratchet wheel 72. An offset portion 88 of lever-actuating arm 80 is pivotally connected at 90 to the outer end of a piston 92 of an air cylinder 94. The air cylinder 94 is pivotally journaled on a horizontal axis, as indicated at 95, to a trunnion 96 which is bolted to a trunnion mounting block 98, as indicated at 100. Trunnion mounting block 98 is rigidly supported on the side support 24 of frame structure 10. Extension of piston 92 causes pawl 86 to engage a tooth of ratchet wheel 72 and move the wheel in a counterclockwise direction.

A spring-mounted pawl 154 pivotally carried on the side support 24 and engaging the ratchet wheel 72, prevents the ratchet 72 from moving in a clockwise direction when the piston 92 is retracted by the air cylinder 94.

A plate element 102 carried on the upper end of air cylinder 94 supports a solenoid bracket 104. A solenoid 106 having a plunger actuating arm 108 is supported on bracket 104 by studs 110. A stop member 112 carried on the piston 92 is adapted to engage the arm 108 when air is applied to the air cylinder 94 and the piston extends outwardly therefrom. Such movement of the piston 92, to a position where it is stopped by the arm 108, will move the drum 32 through an arc sufficient to release one leaf or sheet element 52 from under the influence of the rod 64 so that the sheet element snaps down into position A where it can receive a bag from the bag making machine 16.

When the arm 108 of solenoid 106 is moved out of the way of the stop 112, as shown in Figure 4, the piston 92 can extend its full stroke and the pawl 86 will then move the ratchet wheel 72 and the drum 32 through such an arc that six sheet elements 52 are released from under the influence of rod 64 and, thus, providing a gap in the shingled stack of bags as they are being transferred on conveyor 20. Such gaps are provided when a predetermined number of bags have been made by the bag making machine 16, as will be described later in the specification, so that the operator can pick up a group of bags of predetermined number for packaging.

In Figure 4, the bag making machine 16 is represented schematically and shows a roll of seamless tube material or stock 114 mounted therein. The roll of tube material 114, which, as previously mentioned, is made of "saran" or the like, is fed between feed rollers 116 to the heat sealing jaws, represented schematically at 118. The jaws 118 descend on the tube and fuse the two walls of the tube together, the operation of the jaws being by an electro-pneumatic valve (not shown) which is operated in timed relationship with the feed of predetermined lengths of the material in intermittent step by step motion through the bag making machine. After the jaws 118 have fused a seal in the material 114, a knife schematically represented at 120 descends and cuts off the tube just adjacent to the seal. Feed rollers 122, with the aid of an air blast caused by nozzles or the like, schematically represented at 124, eject a finished bag B with a hot seal S onto one of the leaves 52 which is in the position A of Figure 1. In other words, the bag making machine will be to the left of Figure 1 and the bag will be ejected toward the right of Figure 1 onto the leaf 52 in the position A. The operation of the bag making machine 16 is repetitive, as is understood in the art, and the bags B are continuously delivered therefrom in an intermittent step by step operation.

Since it is necessary to operate the inter-leaving apparatus in timed sequence with the bag making machine 16, the operation of the air cylinder 94 is made dependent upon the operation of the knife or a similar element of the bag making machine. As shown in Figure 4 a two-way air valve 126 is provided with conduits 128 and 130 leading to the lower and upper sides respectively of the piston 92. Conduit 132 leads to a source of compressed air whereas conduit 134 is an exhaust or return air conduit.

Air valve 126 is operated by a solenoid 136 which when deenergized allows air to be applied through the conduit 130 to the upper side of the piston so that the piston 92 is in a contracted position. The air on the lower side of the piston is exhausted through the conduit 134. Solenoid 136 is connected through the current conducting lines 138 and 140 to a source of electrical power 142. A switch 144 in the current conducting line 140, operated by the knife 120 or in timed sequence therewith, makes and breaks the circuit to solenoid 136. When the knife 120 is in or approaching the cutting position, as shown in Figure 4, the switch 144 is closed and the circuit to the solenoid 136 is energized so that the air valve 126 is moved to a position where air pressure from the conduit 132 is supplied to the lower side of the piston 92 through the conduit 128. The piston then moves upwardly and outwardly of cylinder 94. Upward movement of the piston causes the pawl 86 to move the ratchet wheel 72 and the drum 32 so as to release one of the flexible metal sheet elements 52 to the position A. When lever-actuating arm 108 of solenoid 106 is in its extended position, as shown in Figure 1, the upward movement of the piston 92 is restricted by the stop 112 abutting against the end of the arm and, consequently, only one sheet element 52 is released to the position A. On the other hand, when the arm 108 is retracted, as shown in Figure 4, the piston 92 can extend its full stroke and the pawl 86 will move the ratchet wheel 72 so as to release six sheet elements 52 to the position A, and, thus, provide a gap between a group of bags.

Solenoid 106, which is normally deenergized with its actuating arm 108 is in the position shown in Figure 1, is connected by current conducting wires 146 and 148 to the source of power 142. The current conducting line 146 extends through an electric counter unit schematically designated at 150 which may be an electric eye or the like, where there is a switch 152. Switch 152, which is normally open, is actuated to closed position, as shown in Figure 4, upon a predetermined number of movements of the knife 120. In other words, if the counter unit 150 is set to operate on two hundred and fifty cuttings of the knife 120 then the switch 152 will be closed and the solenoid 106 energized to withdraw the lever 108 from the path of stop 112.

In the above description of both the operation of the air cylinder 94 and of the solenoid 106, it will be of course appreciated that it is within the scope of the present invention to operate the units in timed sequence with other operating elements of the bag making machine 16, such as off the movement of the heat sealing jaws 118 or off the intermittent main drive of the feed rollers 116 and 122.

The operation of the interleaving apparatus may be described briefly as follows: Bags B are made from the tubular stock 114 by intermittent step by step motion of the stock through the bag making machine 16. Feed rollers 122 assisted by an air blast from nozzles 124 deliver the bags B with newly formed seal S in one end from the bag making machine 16. The bags float down onto one of the interleaving sheet elements 52 which is in the position A of Figure 1. Referring now to Figure 3, the bag B' just leaving the bag making machine 16 with its still hot seal S' is shown being positioned on the sheet element 52. Previously ejected bag B'' is shown beneath the sheet element 52 on which the bag B' is being deposited. Bag B'' has a seal S'' which is separated from a still previously deposited bag (not shown) by one of the sheet elements 52 on which it was deposited. After the bag B' is deposited on the sheet element 52 and when the cutter 120 of the bag cutting machine cuts another bag B, but prior to the ejection of the most recently cut bag B', the circuit to solenoid 136 will be closed by the closing of switch 144. This actuates the air valve 126 so as to move the piston 92 to a position where the stop 112 normally engages the lever arm 108 of solenoid 106. One of the sheet elements 52, which is in the position B of Figure 1, will be released from under the influence of bar 64 and because it is made of spring steel and is bowed, it will snap down into position A on top of the bag B' shown in Figure 3. The next bag being ejected from the bag making machine will then float onto the sheet element and be separated from the bag B'. Continued intermittent step by step rotation of the drum 32 will move the bags which are in shingled stack form on the conveyor 20 from the left to the right of Figure 1 and the sheet elements 52 will engage the flange 68 of the guide 54 and be gradually withdrawn from between the bags. The time which a bag is separated from an adjacent bag by one of the sheet elements 52 is sufficient to permit cooling and crystallization of the seal of that bag so that the seal will not be sticky and adhere to the adjacent bag.

After the knife element 120 has cut a predetermined number of bags, the counter unit 150 causes the switch 152 to be closed, energizing the solenoid 106 to withdraw the lever arm 108 from the path of the piston stop 112. The piston 92 can then extend its full stroke position and, thus, the pawl 86 will move the ratchet through an arc sufficient to release six sheet elements 52 at once to the position A to thereby cause a gap in the shingled stack of bags traveling on conveyor 20. This provides an easy means for an operator packaging the bags to remove an exact count of bags from the conveyor 20 at its discharge end.

It will be clear from the above that the construction of the apparatus and the method of separating newly made bags of thermoplastic material may be easily and inexpensively converted to accommodate various size bags delivered from various bag making machines and that the present invention otherwise fulfills the enumerated objects.

The terminology used in this specification is for the purpose of description and not limitation, the scope of the invention being defined in the claims.

I claim:

1. In an apparatus for temporarily interleaving seals of heat-sealed bags as they are successively delivered from a bag sealing machine to a take-off conveyor in shingled relationship to each other, a frame structure, a drum rotatably supported on said frame structure above the conveyor, a plurality of flexible sheet elements carried about the periphery of said drum, said sheet elements being adapted to receive at least a portion of a bag when the bag is being transferred to the conveyor so as to separate the bag from a bag previously transferred to the conveyor, each of said sheet elements having its respective free end traveling in a path normally parallel to the path of travel of bags on the conveyor after the sheet element has moved to a position for receiving a bag and at least until the sheet element begins to gradually withdraw from between bags, means to move said drum in intermittent step by step rotation and means cooperating with movement of said drum to restrain and then controllably release said sheet elements whereby said sheet elements are moved one by one to the position to receive a bag being transferred to the conveyor so as to separate the bag from a previously delivered bag and then be gradually removed from between the bags.

2. An apparatus of the character described in claim 1, wherein said last-mentioned means includes a ratchet member operatively connected to said drum, a pawl cooperating with said ratchet member and an air cylinder and piston assembly operable in timed sequence with delivery of bags to the conveyor for actuating said pawl.

3. An apparatus of the character described in claim 2, including stop means to limit the movement of said pawl by said air cylinder and piston assembly.

4. An apparatus of the character described in claim 3, including means to render said stop means inoperative and thereby permit said pawl to be moved by said air cylinder and piston assembly a greater distance so as to increase the amount of rotation of said drum.

5. An apparatus of the character described in claim 4, wherein said last-mentioned means is operable after a predetermined number of bags have been delivered to said conveyor thereby providing a gap between predetermined number of bags on the conveyor.

6. In an apparatus for temporarily interleaving seals of heat-sealed bags as they are delivered from a bag sealing machine to a conveyor, a frame structure, a drum rotatably supported on said frame structure above the conveyor, said drum having an axis positioned across the path of movement of said conveyor, a plurality of flexible sheet elements carried on the periphery of said drum, means to confine and retard the movement of the outer free ends of said sheet elements during a portion of their travel prior to their being interleaved between bags received by the conveyor, said last-mentioned means providing a snap action for said elements so as to quickly position them to receive at least the portion of the bag having the seal, and means to intermittently rotate said drum and its sheet elements in step by step rotation in a direction so that the sheet elements travel under the drum in the same direction as the bags are advanced by the conveyor.

7. An apparatus of the character described in claim 6, wherein said flexible sheet elements are made of metal.

8. An apparatus of the character described in claim 6, including means operable in timed sequence with the delivery of a predetermined number of bags to cause a plurality of said sheet elements to be interleaved between adjacent bags thereby providing a gap in the bags traveling on the take-off conveyor.

9. An apparatus of the character described in claim 6, wherein said means to rotate said drum in step by step movement includes a ratchet wheel carried by said drum, a pawl cooperating with said ratchet wheel, an air cylinder and piston assembly pivotally mounted on said frame structure, said piston being operatively connected to said pawl for moving the same and thereby rotating said drum.

10. An apparatus of the character described in claim 9, including stop means to limit the stroke of said piston and the rotation of said drum.

11. An apparatus of the character described in claim 10, including means to render said stop means inoperative and thereby permit said piston to move said pawl a greater distance and rotate said drum through a greater arc of rotation.

References Cited in the file of this patent

UNITED STATES PATENTS

| 1,722,806 | Linebaugh | July 30, 1929 |
| 1,756,616 | Wood | Apr. 29, 1930 |
| 1,766,083 | Richter | June 24, 1930 |
| 2,158,552 | Potdevin | May 16, 1939 |

FOREIGN PATENTS

| 627,367 | Great Britain | Aug. 8, 1949 |